Feb. 14, 1967 A. C. HETHERINGTON 3,304,364
CONDUCTING TOW LINE STRUCTURE
Filed Jan. 25, 1965 2 Sheets-Sheet 1
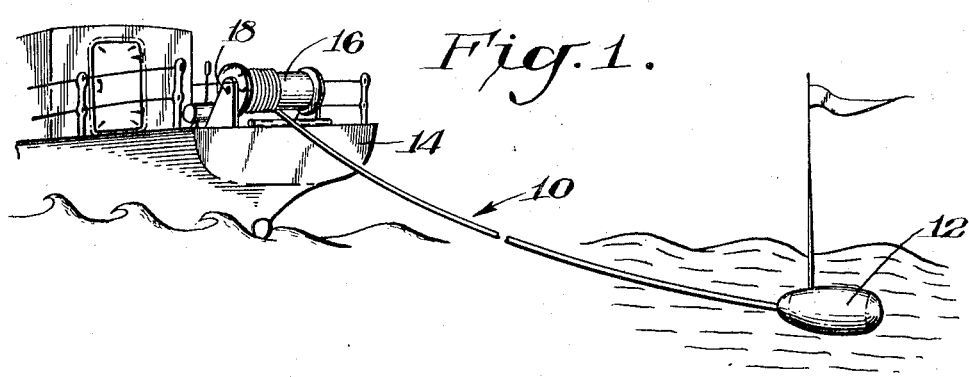
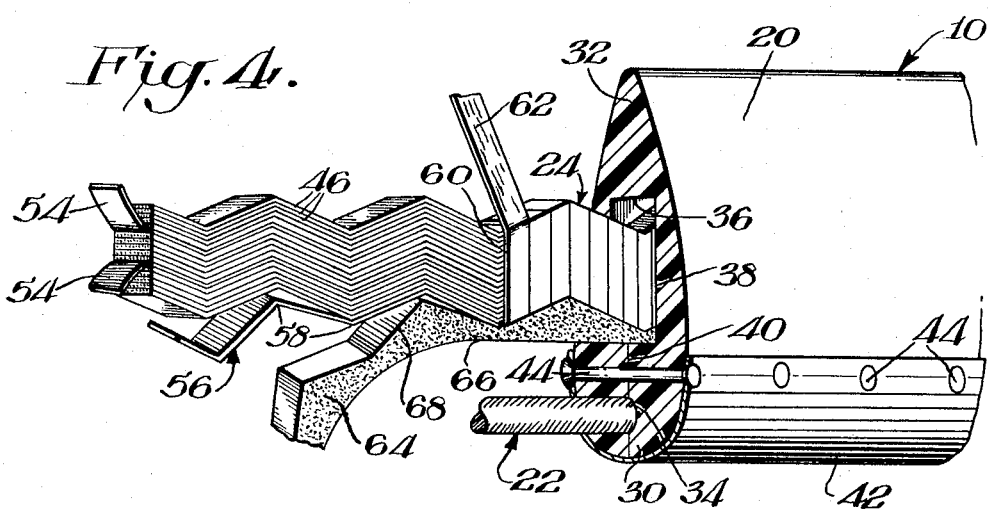
INVENTOR
ALEXANDER C. HETHERINGTON
BY Connolly and Hutz
ATTORNEYS Feb. 14, 1967     A. C. HETHERINGTON     3,304,364
CONDUCTING TOW LINE STRUCTURE
Filed Jan. 25, 1965     2 Sheets-Sheet 2
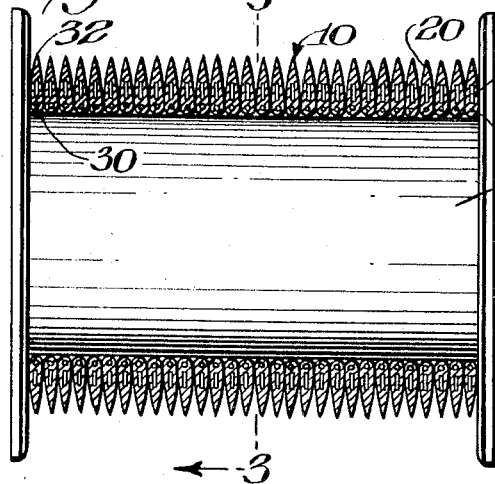
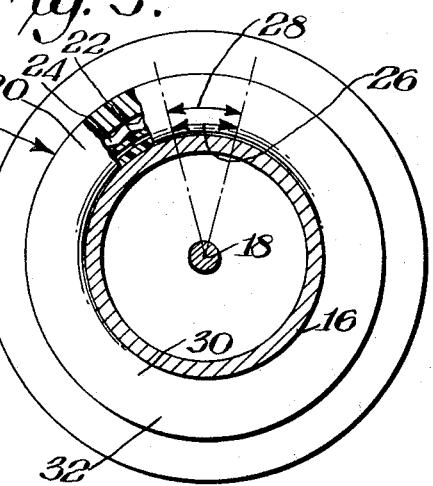
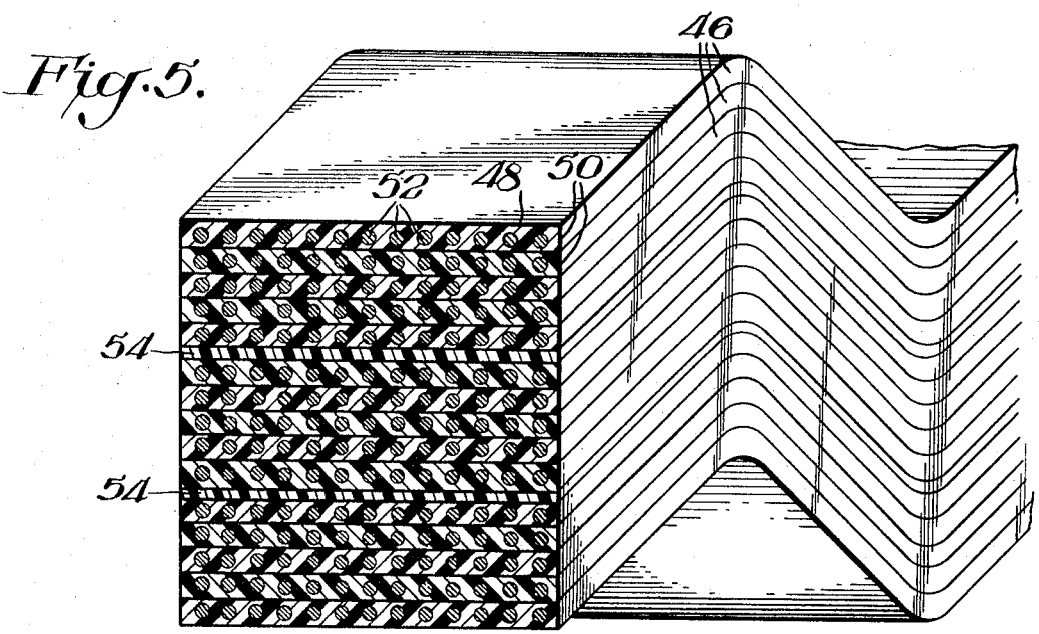
INVENTOR
ALEXANDER C. HETHERINGTON
BY *Connolly and Hutz*
ATTORNEYS United States Patent Office 3,304,364
Patented Feb. 14, 1967

3,304,364
CONDUCTING TOW LINE STRUCTURE
Alexander C. Hetherington, Adrian, Mich., assignor to Stauffer Chemical Company, a corporation of Delaware
Filed Jan. 25, 1965, Ser. No. 427,635
19 Claims. (Cl. 174—101.5)

This invention relates to tow line structure, and more particularly to a tow line including a tension or strength member as well as a yieldable message conducting assembly for towing instrument and other devices through a fluid medium behind parent carriers—such for example as towing sonar devices through the water behind seagoing vessels, although many other industrial, scientific and military uses are contemplated.

Increasingly complex measuring equipment useful for both military and civilian purposes has become so sensitive that it has been found expedient to tow such devices some distance behind the parent carrier vehicle to reduce the noise, vibration, temperature and other side effects of the power plant which motivates the carrier vehicle. This, of course, necessitates intricate electrical and other connections between the towed device and the towing device, as well as a sturdy tension member to transmit the needed physical towing force.

A number of problems, however, have been encountered in prior designs of combination towing and message conducting cables. First, it is clear that the conductors must be insulated from one another, and preferably from the fluid medium through which the tow line structure moves. Additionally, it is desirable that, especially when the large numbers of separate conductors are to be employed, it be easy to identify a given conductor at either end of the length of the tow line structure.

Additionally, with certain towed devices, it is required that the towed object be maintained at a constant depth regardless of wind and wave conditions and the movement of the parent towing vessel. To this end, it has been found desirable to provide an outer transverse cross-sectional configuration to the tow line which is streamlined in general appearance to prevent lateral whipping of the cable and to provide minimum drag and insure depth control. This requires that a tension member such as a steel wire rope be incorporated in the leading edge of the streamlined tow line structure.

Moreover, depth control is regulated by increasing or decreasing the effective length of the tow line between the towed device and the parent towing vessel. This is accomplished by use of a winding or take-up drum but, when the tow line structure is wound upon a rotary drum to increase or decrease its effective length behind the towing vessel, the trailing edge of the tow line structure which does not include the tension member must be capable of elongation to the extent necessary to compensate for the radius differential in the coil on the drum. In addition, the conductors embedded within the structure must be capable of elongation to compensate for the radius winding differential in a manner which does not vary the electrical resistance of the conductors.

Accordingly, it is an object of the present invention to provide tow line structure which accomplishes the above noted purposes.

In a broader sense, it is an object of the present invention to provide tow line structure for pulling towed devices through a fluid medium by means of a parent towing device wherein a plurality of elongatable message conductors are incorporated within the tow line structure.

Another object of the present invention is to provide, within streamlined resilient tow line structure including a tension member, an assembly including plural electric conductors which is capable of elongation without effecting the resistivity, conductivity or other electrical qualities of the individual conductors.

Another object of the present invention is to provide tow line structure comprising an elongated body portion of resilient material, an elongated cavity formed in continuous fashion within the body portion, and a message conducting assembly within the cavity, the assembly including a plurality of elongated yieldable members positioned laterally adjacent each other, each member having at least one generally uninterrupted conductor means integrally formed therein so as to be insulated from the conductor means in the adjacent yieldable members, and yieldable biasing means normally urging the yieldable members into a laterally contoured configuration within the cavity whereby the resilient body portion of the tow line structure is capable of elongation by straightening out the laterally contoured configuration of the yieldable members within the cavity.

Other objects and advantages of the present invention will become apparent to one skilled in the art from a reading of the following description in conjunction with the accompanying drawings wherein similar reference characters refer to similar parts, and in which:

FIG. 1 is an illustration of a typical environment in which the tow line structure of this invention may be used;

FIG. 2 is a plan view of a typical winding drum showing the tow line structure in cross section wound thereupon;

FIG. 3 is a sectional elevational view on line 3—3 of FIG. 2 illustrating a radius differential which is compensated for by the tow line structure;

FIG. 4 is a broken-away illustration showing the relationship of the various components of the tow line structure; and FIG. 5 is a transverse sectional view of the yieldable conductor members which comprise the resilient message conducting portion of the tow line structure of this invention.

Referring in more particularly to the drawings, FIG. 1 illustrates tow line structure 10 according to this invention with a towed measuring or other device 12 secured at one end thereof to ride a predetermined distance below the surface of a body of water. The other end of the tow line structure 10 is secured to a parent towing vessel 14 by means of a take-up winding drum 16 rotatably mounted as at 18 to the stern of the vessel 14. The particular towed device 12 and the particular parent towing vessel 14, including its particular winding drum 16, per se form no part of the present invention, and are illustrated primarily to explain one set of environmental factors which impose severe requirements upon tow line structure of the nature to which this invention pertains.

Referring to FIGS. 2 and 3, the drum 16 upon which the tow line structure is wound for storage purposes on the parent towing vessel is ordinarily designed to support a number of adjacent windings of tow line. The tow line 10 includes an elongated body portion 20 of resilient material which houses an essentially non-stretchable, continuous tension member 22 as well as a continuous assembly 24 of electrical or other conductor means. The tension member 22 and the message conducting assembly 24 are spaced apart in parallel relationship running the length of the elongated body portion. In winding such tow line on the drum 16, it will be appreciated that the tension member 22 is wound adjacent the drum while the message conducting assembly 24 is necessarily spaced radially outwardly therefrom for maximum storage capacity on the drum. As can be seen in FIG. 3, for a given length of tension member 22, as indicated by the arcuate arrow 26, the corresponding length of message conductor assembly 24, as indicated by the arcuate arrow 28, is considerably elongated depending upon the difference in radius of the two circles which the elements 22 and 24 occupy. In the towing condition, of course, the length of the tension member 22 and message conductor assembly 24 must correspond. Accordingly, it is obvious that the message conductor assembly 24 must be capable of elongation and, since at least part of the tow line remains upon the winding drum during operation, the elongation of the message conductor assembly 24 must be accomplished without effecting the resistivity and other electrical values thereof.

To this end, the elongated body portion 20 of resilient material according to this invention, as best seen with reference to FIG. 4, preferably is sufficiently tough or rugged to withstand the temperature, fluidity, abrasion, chemical or other environmental factors to which the tow line structure will be subjected. Preferably, for oceanographic use for example, this may be a butyl compound of any well-known variety which may be extruded or otherwise fabricated in the desired lengths and with the desired cross-sectional configuration. At present, the desired cross-sectional configuration includes an oval shape which has one end of the oval blunted or enlarged as at 30, this end of larger radius forming the leading edge of the streamlined tow line. The other end of the oval is sharper or smaller as at 32, this smaller radius forming the trailing edge of the streamlined tow line.

An elongated cavity 34 formed in continuous fashion within the leading edge 30 of the body portion 20 is provided to accommodate the tension member 22. If the tension member 22 comprises a steel wire rope, as is presently found desirable, the cavity 34 is desirably of circular cross-section having a diameter corresponding to the diameter of the wire rope.

A second elongated cavity 36 is provided in continuous fashion within the body portion 20 to accommodate the message conducting assembly 24. In the preferred design according to this invention, the cavity 36 has a rectangular cross-sectional configuration. The length of the long sides 38 of the rectangular cavity have a dimension which corresponds with the maximum lateral dimension of the message conducting assembly, as explained below. As with the circular cavity 34, the rectangular cavity 36 may be of a generally constant cross-section throughout the length of the tow line structure.

As assembled, the cavities 34 and 36 are arranged within the body portion 20 in parallel, spaced apart relationship, the rectangular cavity 36 being located adjacent the mid-portion or nearer the trailing edge of the tow line whereas the cavity 34 for the tension member 22, as mentioned above, is located adjacent the leading edge. For assembly purposes, the body portion 20 may be formed as partial split halves separated as at 40 from the leading edge end of the rectangular cavity 36 through the circular cavity 34 and to the outer extremity of the leading edge 30. In this manner, the body portion 20 may be laid open during manufacture to first package the message conductor assembly 24 in the rectangular cavity 36, and thereafter incorporate the tension member 22 in the circular cavity 34. Thereafter, the split halves may be closed upon one another to completely encase the assembly 24 and tension member 22.

If desired, the split halves may be secured together by a flexible partial sheathing 42 secured as at 44 to the body portion 20. Such a sheathing not only serves to secure the split halves of the body portion 20 together in the desired manner, but also serves as a protecting shield against abrasive effects which may be encountered by the leading edge of the tow line structure.

Having reference to FIGS. 4 and 5, the message conducting assembly 24 of this invention comprises a plurality of elongated yieldable members 46 positioned laterally adjacent each other. Each elongated yieldable member 46 advisably takes the form of a continuous tape-like member having a width dimension 48 far in excess of its thickness dimension 50. The tape-like members 46 are positioned laterally adjacent each other in laminar array to provide a package of such tape-like members. The members 46 may be formed of suitable electrical insulating material having the desired waterproofing as well as flexing or yielding characteristics. Advisability, appropriate silicon rubber compounds have been found suitable for this purpose.

Each tape-like yieldable member includes a plurality of uninterrupted conductor means 52 integrally formed therein. The conductor means in each member are positioned in side-by-side relationship in a plane substantially common with the cross-sectional centerline of the member 46, that is, in a plane parallel with the width dimension 48 of the member. This positions the conductors 52 so that they do not contact each other, and so that they flex readily with the members 46.

Each conductor 52 preferably comprises a flexible metal member having high electrical conductivity. Although solid, circular cross-section conductors 52 are illustrated, it will be appreciated that multiple strand wire or flat, ribbon shape conductors may be employed if desired. Materials such as copper, silver and the like have the required electrical conductivity and other electrical properties but do not, as is well-known, have the inherent resiliency or "memory" of materials such as steels which are appropriately tempered to produce spring-like qualities. Additionally, it will be appreciated that actual stretching of conductor wires causes diameter decrease which results in highly undesirable variations in electrical resistivity or conductivity.

Each yieldable member 46 may include from one to ten or more conductor means 52. In the illustration of FIG. 5, thirteen such conductors are shown in each yieldable member 46. With a package of ten of the yieldable members 46, it will be appreciated that up to one hundred and thirty individual conducting members 52 may be provided. For complex message transmission required for certain towed devices, the drawing in FIG. 5 illustrates a total of one hundred and ninety-five conductor means 52 embedded within fifteen yieldable members 46 arranged adjacent each other in laminar array.

Additionally, a plurality of slippage promoting strips 54 may be interleaved between groups of the tape-like yieldable members 46. With small groups of three to, say, seven layers of tape-like members 46, such strips 54 would be unnecessary for certain uses. On the other hand, with a large number of tape-like members 46, it has been found expedient to include at least several of such strips at spaced intervals to promote lateral flexing of the package of tape-like members in the manner described below. The slippage members 54 have a width dimension corresponding to the width dimension 48 of the tape-like members 46, and a thickness dimension as small as practical. When the tape-like members 46 are fabricated of silicon rubber compounds as suggested above, it has been found that the slippage ribbons 54 are desirably fabricated of material having self-lubricating qualities to prevent adhesion in contact with the particular silicon rubber compound, such as Teflon or Mylar. Alternatively, pairs of adjacent ribbons may be interleaved wherein slippage occurs at the interface between the ribbons.

Because it is not economically feasible to provide conductor means 52 having suitable electrical properties in combination with suitable spring-like or resilient qualities, the package of yieldable tape-like members 46 are packaged according to this invention adjacent a supplemental yieldable biasing means 56. Such a yieldable biasing means may comprise a generally continuous strip of reinforced glass or spring steel tempered to provide the desired resiliency characteristics. The thickness dimension and tensile modulus of the strip 56 will vary according to the amount of resiliency required for the particular package of tape-like members which include the conductor means. The width dimension of the strip 56 of spring material may correspond with the width dimension 48 of the tape-like members 46. The strip 56 of spring material is provided with a predetermined laterally contoured configuration in its normally relaxed position. This includes a series of spaced peaks 58 alternately arranged in sinusoidal fashion which enables the overall length of the strip to increase as the lateral contortions are straightened out, that is, as the lateral distance between the opposed peaks 58 is reduced, as can be understood.

Preferably, the message conductor assembly 24 comprises a bundle of the above described tape-like members 46 each of which includes a plurality of conductor means 52 secured together in laminar array against the length of spring steel 56. If desired, as noted above, one or more strips of slip promoting material 54 may be included. The bundle of members 46 are desirably secured against the spring 56 by means of a resilient housing 60. This preferably is a water-tight membrane, and may be formed of heat fusing polyolefin tape, heat shrinkable tubing, or even extrusion of a plastic jacket. As illustrated in FIG. 4, at present the most favorable housing 60 comprises a spiral overwrapping of resilient tape 62 encasing both the bundle of members 46 and the spring 56. Each pitch of the spiral tape overwrapping is adhered to its adjacent pitches to form the fluid tight housing 60. A preferred industrial wrapping tape for this purpose comprises a fibreglass supported silicon rubber tape having adhesive material incorporated on at least one side thereof. As can be seen in the drawings, this constitutes a message conducting assembly of rectangular cross-sectional configuration including from several up to perhaps two hundred or more individual electrical conductors and having an overall appearance of a sinusoidal or lateral zig-zag contour in side elevation. Preferably, no lateral contortions are visible in plan view. As can be appreciated, the overall length of a given section of the message conducting assembly 24 may be increased by straightening out the lateral contours thereof.

As illustrated in the drawings, the assembly 24 is conveniently packaged within the cavity 36, the total height dimension of the assembly 24 in its naturally relaxed contoured configuration generally corresponding to the length dimension 38 of the rectangular cavity. If desired, an additional member 64 of sponge-like material having a flat bottom surface 66 and a laterally contoured upper surface 68 may be included within the cavity 36 adjacent the assembly 24. The contoured upper surface 68 of the member 64 corresponds with the contours of the assembly 24 as established by the spring 56 in the normally relaxed position. Such a member 64 is desirable under certain conditions to assure proper return of the assembly to its normally relaxed contoured position, as well as to eliminate voids which might collect fluid or permit looseness of the assembly 24 within the body portion 20. Again, as with the slippage promoting strips 54, the member 64 may be omitted entirely or, on the other hand, a pair of such members may be employed one on the leading edge of the assembly 24 as shown and the other within the cavity 36 adjacent the trailing edge of the arrangement 24, as can be understood.

Thus, improved tow line structure has been disclosed which includes a tension member of the desired characteristics as well as a message conducting assembly capable of controlled elongating without effecting the electrical characteristics thereof. A very large number of individually separated conductors are readily provided in a given cross-sectional area, the individual conductors may be of any convenient gage, and identification of individual conductors at each terminus of the tow line structure is made with ease. Additionally, the entire assembly is provided within the presently preferred tow line structure which if of streamlined cross-sectional shape, and can be manufactured, assembled and conveniently handled by well developed procedures.

While the above described embodiment constitutes the preferred mode of practicing this invention, many other physical embodiments and legal equivalents may be resorted to within the scope of the actual invention, which is claimed as follows.

What is claimed is:

1. Tow line structure comprising an elongated body portion of resilient material, an elongated cavity formed in continuous fashion within the body portion, and a message conducting assembly within the cavity, the assembly including a plurality of elongated yieldable members positioned laterally adjacent each other, each member having at least one generally uninterrupted conductor means integrally formed therein so as to be insulated from the conductor means in the adjacent yieldable members, and yieldable biasing means normally urging the yieldable members into a laterally contoured configuration within the cavity whereby the resilient body portion of the tow line structure is capable of elongation by straightening out the laterally contoured configuration of the yieldable members within the cavity, said yieldable biasing means having a configuration conforming essentially to that of said yieldable members.

2. Tow line structure as in claim 1 wherein the elongated body portion of resilient material is generally oval shaped in cross-sectional view with one end of the oval being sharper than the other end thereof to form a streamlined configuration.

3. Tow line structure as in claim 2 wherein the elongated cavity within the body portion is of generally rectangular configuration in cross-sectional view.

4. Tow line structure as in claim 3 wherein an elongated tension member is positioned within the body portion parallel with and spaced from the elongated cavity.

5. Tow line structure as in claim 4 wherein the tension member comprises a continuous steel wire rope running through the larger end of the oval cross-sectional configuration of the body portion, and the rectangular elongated cavity is located adjacent the smaller end of the oval.

6. Tow line structure as in claim 1 wherein the elongated yieldable members of the assembly each take the form of continuous tape-like members which are positioned laterally adjacent each other in laminar array.

7. Tow line structure as in claim 6 wherein each elongated yieldable member includes a plurality of uninterrupted conductor means integrally formed therein, and the conductor means in each take-like elongated yieldable member are positioned in side-by-side relationship in a plane substantially common with the cross-sectional centerline of the member.

8. Tow line structure as in claim 7 wherein the uninterrupted conductor means in each elongated yieldable member comprise flexible metal members having high electrical conductivity.

9. Tow line structure as in claim 1 wherein the yieldable biasing means which normally urges the yieldable members into a laterally contoured configuration within the cavity comprises an essentially continuous length of spring material and wherein the normally relaxed configuration of the length of spring material corresponds with the desired laterally contoured configuration of the elongated yieldable members.

10. Tow line structure as in claim 9 wherein the plurality of elongated yieldable members are secured together as a bundle and the bundle is secured against the length of spring material by a resilient housing.

11. Tow line structure as in claim 10 wherein the resilient housing for the bundle of yieldable members and the length of spring material comprises a spiral overwrapping of resilient tape wherein each pitch of the spiral tape is adhered to its adjacent pitches to form a fluid-tight housing.

12. Tow line structure as in claim 11 wherein the voids within the elongated cavity which result from the laterally contoured configuration of the assembly are filled with a resilient, sponge-like material.

13. Tow line structure as in claim 11 wherein the elongated yieldable members of the assembly each take the form of continuous tape-like members which are positioned laterally adjacent each other in laminar array.

14. Tow line structure as in claim 13 wherein an elongated member of material which is readily slidable in contact with the material of which the tape-like yieldable members are made is sandwiched between a pair of the tape-like yieldable members to facilitate straightening out the laterally contoured configuration of the tape-like yieldable members.

15. Tow line structure as in claim 11 wherein the elongated body portion of resilient material is generally oval shaped in cross-sectional view with one end of the oval being shaper than the other end thereof to form a streamlined configuration, and an elongated tension member is positioned within the body portion parallel with and spaced from the elongated cavity.

16. Tow line structure as in claim 15 wherein the tension member comprises a continuous steel wire rope running through the larger end of the oval cross-sectional configuration of the body portion, and the rectangular elongated cavity is located adjacent the smaller end of the oval.

17. Tow line structure as in claim 16 wherein a yieldable protective member encases at least the portion of the elongated body portion which includes the steel wire rope tension member.

18. Tow line structure as in claim 11 wherein the laterally contoured configuration of the assembly within the cavity takes the form of regular sinusoidal fluctuations in a single plane.

19. Tow line structure as in claim 18 wherein the configuration of the cavity in cross-sectional view is generally rectangular with one side of the rectangle having a dimension coresponding to the maximum overall height dimension of the sinusoidally contoured assembly in its normally relaxed position.

References Cited by the Examiner

UNITED STATES PATENTS

| | | | |
|---|---|---|---|
| 2,424,388 | 7/1947 | Duna | 174—101.5 |
| 2,435,956 | 2/1948 | Craig | 174—70 |
| 3,176,646 | 4/1965 | Natwick | 174—117 |

OTHER REFERENCES

Jensen, Self-Retracting Cables for Electronic Equipment, June 1958, Hughes Aircraft, Culver City, Calif., page 5.

LEWIS H. MYERS, *Primary Examiner.*

E. GOLDBERG, *Assistant Examiner.*